(12) United States Patent
Dion et al.

(10) Patent No.: US 12,102,925 B2
(45) Date of Patent: Oct. 1, 2024

(54) COMPETITIVE EVENT BASED REWARD DISTRIBUTION SYSTEM

(71) Applicant: Electronic Arts Inc., Redwood City, CA (US)

(72) Inventors: Matthew Aaron Dion, Los Angeles, CA (US); Chong Won Ahn, Rancho Palos Verdes, CA (US)

(73) Assignee: Electronic Arts Inc., Redwood City, CA (US)

( * ) Notice: Subject to any disclaimer, the term of this patent is extended or adjusted under 35 U.S.C. 154(b) by 28 days.

(21) Appl. No.: 17/647,590

(22) Filed: Jan. 10, 2022

(65) Prior Publication Data

US 2023/0219009 A1     Jul. 13, 2023

(51) Int. Cl.
| | | |
|---|---|---|
| A63F 13/00 | (2014.01) | |
| A63F 13/69 | (2014.01) | |
| A63F 13/798 | (2014.01) | |

(52) U.S. Cl.
CPC ............ *A63F 13/798* (2014.09); *A63F 13/69* (2014.09)

(58) Field of Classification Search
CPC ........ A63F 13/77; A63F 13/822; A63F 13/56; A63F 13/55
See application file for complete search history.

(56) References Cited

U.S. PATENT DOCUMENTS

| | | |
|---|---|---|
| 6,222,925 B1 | 4/2001 | Shiels et al. |
| 7,980,855 B1 | 7/2011 | Scheuring et al. |
| 8,043,159 B2 | 10/2011 | Bae et al. |
| 10,835,824 B2 | 11/2020 | Laker |
| 11,724,195 B2 | 8/2023 | Laker |
| 2002/0082071 A1 | 6/2002 | Riendeau et al. |
| 2004/0143852 A1 | 7/2004 | Meyers |
| 2004/0254019 A1 | 12/2004 | Riendeau et al. |
| 2005/0267987 A1 | 12/2005 | Kareev et al. |
| 2006/0247034 A1 | 11/2006 | Schneider et al. |
| 2007/0010325 A1 | 1/2007 | Suzuki et al. |
| 2008/0168807 A1* | 7/2008 | Dion .................... A63F 13/215 725/91 |
| 2009/0098939 A1 | 4/2009 | Hamilton, II et al. |
| 2009/0117989 A1 | 5/2009 | Arezina et al. |
| 2009/0170593 A1 | 7/2009 | Pacey |
| 2010/0267450 A1 | 10/2010 | McMain |
| 2012/0004039 A1 | 1/2012 | Perry et al. |

(Continued)

FOREIGN PATENT DOCUMENTS

| | | |
|---|---|---|
| CN | 101553289 A | 10/2009 |
| CN | 105611974 A | 5/2016 |

OTHER PUBLICATIONS

Star Wars Jedi Fallen Order—https://youtu.be/Y1bWJhvneyl?si=G8PaFiJspfgTlgLG (Year: 2019).*

*Primary Examiner* — David L Lewis
*Assistant Examiner* — Eric M Thomas
(74) *Attorney, Agent, or Firm* — Knobbe, Martens, Olson & Bear, LLP

(57) ABSTRACT

The present disclosure provides a video game based reward distribution system. The reward system can provide users with a plurality of progression tracks that allow the users to choose how to progress through the reward map when advancing or leveling up a virtual character or user account within the video game.

19 Claims, 6 Drawing Sheets

(56) References Cited

U.S. PATENT DOCUMENTS

| | | |
|---|---|---|
| 2013/0090158 A1* | 4/2013 | Hornik ................ G07F 17/3227 |
| | | 463/25 |
| 2013/0217473 A1 | 8/2013 | Oakes et al. |
| 2013/0254660 A1 | 9/2013 | Fujioka |
| 2014/0080558 A1 | 3/2014 | Knutsson |
| 2014/0148239 A1 | 5/2014 | Guase et al. |
| 2014/0358651 A1 | 12/2014 | Koh et al. |
| 2015/0094134 A1 | 4/2015 | Noyes |
| 2015/0149391 A1 | 5/2015 | Ziolko et al. |
| 2015/0174489 A1 | 6/2015 | Evald et al. |
| 2015/0258454 A1 | 9/2015 | King et al. |
| 2015/0298004 A1 | 10/2015 | Villoria |
| 2015/0321099 A1 | 11/2015 | Knuttson et al. |
| 2015/0367233 A1* | 12/2015 | Hicks ..................... A63F 13/87 |
| | | 463/31 |
| 2016/0048286 A1 | 2/2016 | Picon et al. |
| 2016/0050446 A1 | 2/2016 | Fujioka et al. |
| 2016/0354683 A1 | 12/2016 | Palmisano et al. |
| 2017/0003740 A1 | 1/2017 | Verfaillie et al. |
| 2017/0092057 A1 | 3/2017 | Knutsson |
| 2017/0098381 A1 | 4/2017 | Stewart |
| 2017/0312632 A1 | 11/2017 | Curley et al. |
| 2017/0354884 A1 | 12/2017 | Benedetto et al. |
| 2017/0354888 A1 | 12/2017 | Benedetto et al. |
| 2021/0138348 A1 | 5/2021 | Laker |

\* cited by examiner

COMPETITIVE EVENT BASED REWARD DISTRIBUTION SYSTEM

BACKGROUND

Video games have increased in popularity and complexity in recent years. Today's video games have many more features and can be much more complex than video games of the past. Video games generally provide rewards for players based on actions performed within a game application.

SUMMARY OF EMBODIMENTS

The systems, methods, and devices of this disclosure each have several innovative aspects, no single one of which is solely responsible for the all of the desirable attributes disclosed herein.

One embodiment discloses a method for providing a virtual item distribution system to users in an online game, the method comprising: by one or more processors configured by machine-readable instructions, executing a game instance of a virtual environment in which the online game is played, and to facilitate presentation of virtual environment of the online game to a plurality of users including a first user; presenting a virtual reward interface to the first user, wherein the virtual reward interface provides a primary reward track comprising a first plurality of virtual reward nodes and a secondary reward track comprising a second plurality of virtual reward nodes wherein the first plurality of virtual reward nodes are associated with virtual rewards of the primary reward track and the second plurality of virtual reward nodes are associated with virtual rewards of the secondary reward track, wherein the primary reward track and the secondary reward track are accessible by the first user for a defined time period, wherein the user has a first level of progression associated with the primary reward track and a second level of progression associated with the secondary reward track, wherein the first level of progression is independent of the second level of progression; providing access to a virtual event based at least in part on the second level of progression, wherein the virtual event is accessible to a first subset of the plurality of users; determining a ranking of the first user based on participation within the first virtual event; based on a determination that the first user satisfied a ranking threshold, receiving a selection of a first virtual reward based at least in part on the determined ranking of the first user; and determining a distribution of the first virtual reward based on the determined ranking of the first user.

In some embodiments, the method further comprises receiving secondary advancement currency from the first user account to unlock access to the secondary reward track. In some embodiments, the primary reward track and the secondary reward track require different types of virtual advancement currency to advance the corresponding level of progression. In some embodiments, the primary reward track and the secondary reward track are different nonintersecting tracks. In some embodiments, the virtual event is a competitive event, and the ranking of first user is based on relative performance of the first user as compared to other users of the first subset of the plurality of user. In some embodiments, the distribution of the first virtual reward includes distribution of the first virtual reward to each user of the first subset of users. In some embodiments, the selection of the first virtual reward is one of a plurality of selections of virtual rewards by others that satisfied the ranking threshold, and the distribution of the first virtual reward is based on a determination that the majority of users that satisfied the ranking threshold selected the first virtual reward. In some embodiments, the method further comprises determining the first user satisfies event access criteria prior to providing access to the virtual event. In some embodiments, the reward map is inaccessible after the defined time period. In some embodiments, the method further comprises displaying a virtual reward node information interface identifying one or more virtual rewards associated with the virtual reward node and the respective ranking associated with the one or more virtual rewards. In some embodiments, the method further comprises determining progression of the first user along the primary reward track and the secondary reward track based on in-game activities performed during a game session of the video game, and advancing the first level of progression and the second level of progression based on the in-game activities.

Another embodiment a computing system comprises one or more hardware processors configured with computer-executable instructions that configure the computing system to: execute a game instance of a virtual environment in which the online game is played, and to facilitate presentation of virtual environment of the online game to a plurality of users including a first user; present a virtual reward interface to the first user, wherein the virtual reward interface provides a primary reward track comprising a first plurality of virtual reward nodes and a secondary reward track comprising a second plurality of virtual reward nodes wherein the first plurality of virtual reward nodes are associated with virtual rewards of the primary reward track and the second plurality of virtual reward nodes are associated with virtual rewards of the secondary reward track, wherein the primary reward track and the secondary reward track are accessible by the first user for a defined time period, wherein the user has a first level of progression associated with the primary reward track and a second level of progression associated with the secondary reward track, wherein the first level of progression is independent of the second level of progression; provide access to a virtual event based at least in part on the second level of progression, wherein the virtual event is accessible to a first subset of the plurality of users; determine a ranking of the first user based on participation within the first virtual event; based on a determination that the first user satisfied a ranking threshold, receive a selection of a first virtual reward based at least in part on the determined ranking of the first user; and determine a distribution of the first virtual reward based on the determined ranking of the first user.

In some embodiments, the computer-executable instructions further configure the computing system to receive secondary advancement currency from the first user account to unlock access to the secondary reward track. In some embodiments, the primary reward track and the secondary reward track require different types of virtual advancement currency to advance the corresponding level of progression. In some embodiments, the primary reward track and the secondary reward track are different nonintersecting tracks. In some embodiments, the virtual event is a competitive event, and the ranking of first user is based on relative performance of the first user as compared to other users of the first subset of the plurality of user. In some embodiments, the distribution of the first virtual reward includes distribution of the first virtual reward to each user of the first subset of users. In some embodiments, the selection of the first virtual reward is one of a plurality of selections of virtual rewards by others that satisfied the ranking threshold, and the distribution of the first virtual reward is based on a determination that the majority of users that satisfied the ranking threshold selected the first virtual reward. In some embodiments, the computer-executable instructions further configure the computing system to determine progression of the first user along the primary reward track and the secondary reward track based on in-game activities performed during a game session of the video game, and advance the first level of progression and the second level of progression based on the in-game activities.

DETAILED DESCRIPTION

Overview

Figure 1:
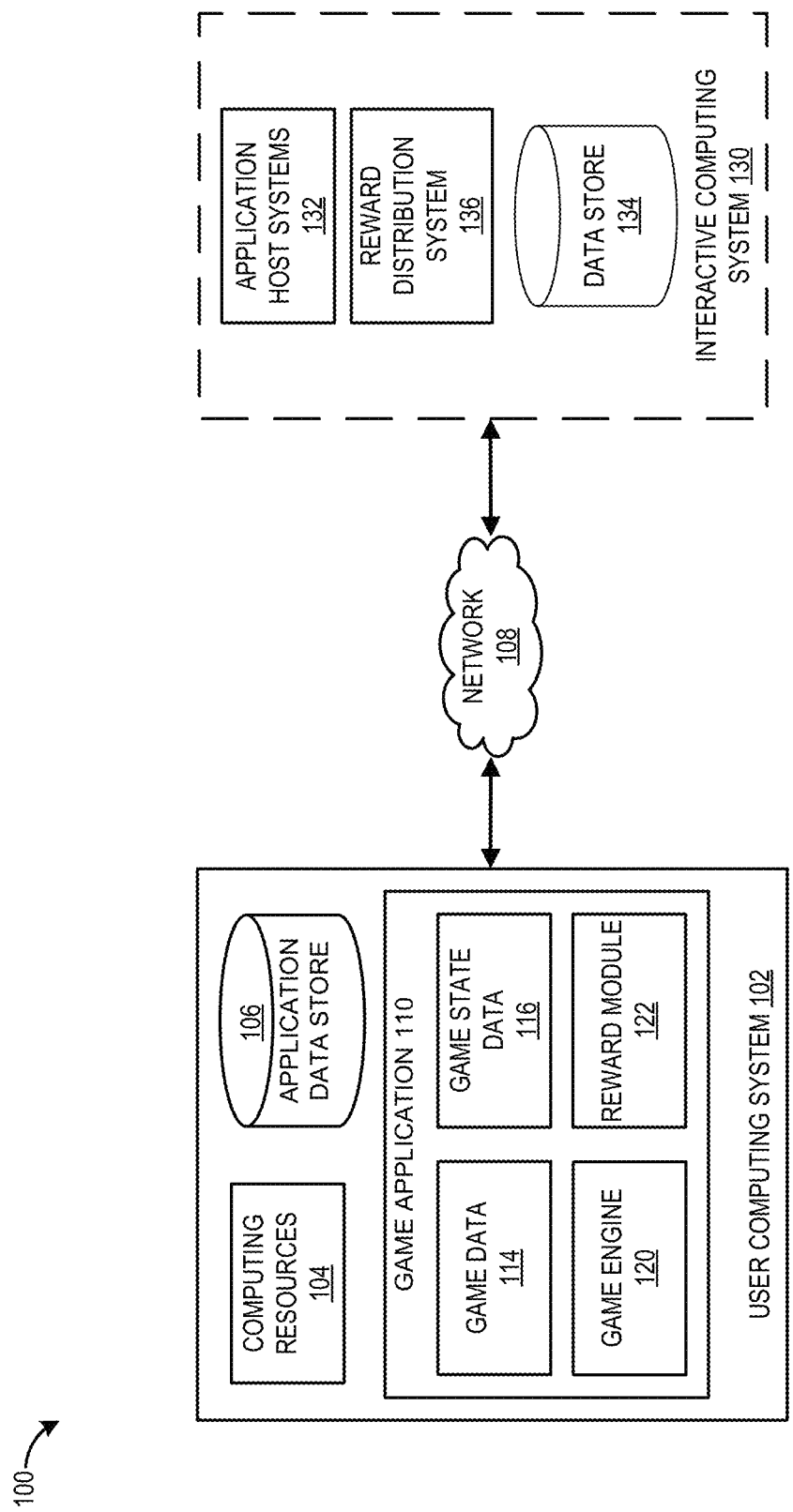
FIG. 1 illustrates an embodiment of computing architecture for implementing a reward distribution system.

The present disclosure provides for a virtual reward distribution system that includes a progression map and a plurality of virtual rewards to incentivize players to continue to play a video game during one or more defined time periods. The virtual reward system can provide users with a non-linear progression structure that allows the users to choose how to progress through the reward structure when advancing or leveling up a virtual character or user account within the video game. The virtual progression structure can provide a series of non-linear pathway or tracks that a user can follow based on how the user would like to proceed and the type of rewards the user would prefer to unlock. The progression structure can provide a series of reward nodes within a plurality of pathways or tracks that a user can select during advancement within the video game. The user can select individual reward nodes when the virtual character levels up and progresses within the progression structure.

The user can earn one or more virtual rewards, such as virtual items usable by a virtual character within the video game, at each reward nodes. The virtual rewards received by a user during advancement are based on the reward nodes selected by the user and a specific track chosen by the user. Each virtual reward is associated with at least one track. When the user unlocks a reward node the user can receive virtual rewards that correspond to the track associated with the user account. For example, a user that progresses on a track associated with a specific character class type is eligible to receive a virtual reward from a reward node associated with the advancement. In some embodiments, a user may be progressing down a series of tracks in parallel. For example, a user may have a class specific track and a primary advancement track. The progression systems for advancing along each track may be different and independent from one another.

The system can include primary and secondary tracks to unlock various virtual rewards within the game. In some embodiments, the secondary track can be a competitive track that provides specific virtual rewards unique to the competitive track. The competitive rewards can be received based on progression on the competitive track. The competitive track can utilize a system that determines rewards based at least in part on a ranking of users during competitive events. For example, the video game can have a timed event where the characters are competing against each other to determine who is the winner of the event. The competitive events may be limited to a subset of users that satisfy entry requirements for the competitive events. The virtual rewards may only be provided only to the subset of players associated with a specific track, or the winner of the event may be able to choose a reward that is distributed to all players within the game from a pool of available rewards.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from a seasonal reward distribution system. The detailed description and drawings are merely illustrative of the disclosure rather than limiting, the scope of the disclosure being defined by the appended claims and equivalents thereof.

Overview of Video Game Environment

FIG. 1 illustrates an embodiment of a computing environment 100 for implementing a seasonal reward distribution system. The environment 100 includes a network 108, a user computing system 102, and an interactive computing system 130, which includes at least application host systems 122, and a data store 124. To simplify discussion and not to limit the present disclosure, FIG. 1 illustrates only one user computing system 102, and one interactive computing system 130, though multiple systems may be used.

The user computing system 102 may communicate via a network 108 with the interactive computing system 130. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

User Computing Systems

The user computing system 102 may include hardware and software components for establishing communications over a communication network 108. For example, the user systems 102 may be equipped with networking equipment and network software applications (for example, a web browser) that facilitate communications via one or more networks (for example, the Internet or an intranet). The user computing system 102 may have varied local computing resources 104, such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below with respect to FIG. 8.

Game Application

The user computing system 102 can execute a game application 110 based on software code stored at least in part in the application data store 106. The game application 110 may also be referred to as a video game, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to game simulation, rendering, animation, and other game data.

In the illustrated embodiment, the user computing system 102 is capable of executing machine readable instructions that are configured to execute the game application 110 stored on a data store on the user computing system (e.g., application data store 106). The game application 110, when executed, includes a game engine 120, game data 114, and game state information 116. The game application, when executed, is configured to generate a virtual environment for a user to interface with the game application 110.

In some embodiments, the user computing system 102 may be configured to execute a game application 110 stored and/or executed in a distributed environment using a client/server architecture. For example, the user computing system 102 may execute a portion of a game application 110 and the interactive computing system 130, or an application host system 132 of the interactive computing system 130, may execute another portion of the game application 110. For instance, the game application may be a massively multiplayer online role-playing game (MMORPG) that includes a client portion executed by the user computing system 102 and a server portion executed by one or more application host systems 132. The game application 110 can execute on the user computing system 102 or a distributed application that includes a portion that executes on the user computing system 102 and a portion that executes on at least one of the application host systems 122. In some embodiments, the game application 110 may execute entirely on the interactive computing system 130, and the interactive computing system 130 may stream the gameplay of the game application 110 to the user computing system 102 over the network 108.

Game Engine

The game engine 110 can be configured to execute aspects of the operation of the game application 108 within the player system(s) 102. Execution of aspects of gameplay within a game application can be based, at least in part, on the player input received, the game data 112, and game state information 116. The game engine 110 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 110 can receive the player inputs and determine in-game events, such as actions, jumps, runs, throws, attacks, and other events appropriate for the game application 108. During runtime operation, the game engine 110 can read in game data 112 and game state information 116 to determine the appropriate in-game events.

Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the data store 134, in such embodiments, game data may be received during runtime of the game application.

Game State Data

During runtime, the game application 110 can store game state data 116, which can include a game state, character states, environment states, scene object storage, route information and/or other information associated with a runtime state of the game application 110. For example, the game state data 116 can identify the state of the game application 110 at a specific point in time, such as a character position, character orientation, character action, game level attributes, and other information contributing to a state of the game application. The game state data 116 can include simulation state data and graphical state data. The simulation state data includes the game state data that is used by the simulation engine 122 to execute the simulation of the game application. The graphical state data includes game state data that is generated based on the simulation state data and is used by the presentation engine 124 to generate and render frames for output, such as to a display of the user computing system 102.

Reward Module

The reward module 122 can be configured to provide access to a user to the seasonal reward system 136. The reward module can be configured to communicate with the reward distribution system to display the reward information in a user interface within the game application 110. The reward information may include various interfaces for interacting with and obtaining rewards associated with that reward distribution system. For example, the reward module 122 may provide additional user interfaces for purchasing rewards, track access, upgrades, and other types of virtual items and/or currencies for use within the game application 110. In some embodiments, the reward module may be configured to display a reward interface that is accessible to the user outside of execution of the game application 110.

Interactive Computing System

The interactive computing system 130 can include one or more application host systems 132 and account data store(s) 134. The interactive computing system 130 may include one or more computing systems configured to execute a portion of the game application 110 and/or host application 106. In some embodiments, the one or more application host systems 122 can include one or more computing devices, such as servers and databases that may host and/or execute a portion of one or more instances of the game application 110 and/or a host application (not shown). In certain embodiments, instead of or in addition to executing a portion of the game application 110 and/or host application, the application host systems 122 may execute another application, which may complement and/or interact with the application 104 during execution of an instance of the application 104.

Application Host System(s)

The interactive computing system 130 may enable multiple users or computing systems to access a portion of the game application 110 and/or host application 106 executed or hosted by the interactive computing system 130. In some embodiments, the portion of the game application 110 executed by application host systems 132 of the interactive computing system 130 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 130. A set of users may be assigned to or may access one instance of the persistent virtual world while another set of users may be assigned to or may access another instance of the persistent virtual world.

In some embodiments, the host application system 132 may execute a hosting system for executing various aspects of a game environment. For example, in one embodiment, the game application 110 may be a competitive game, such as a first person shooter or sports game, and the host application system 132 can provide a dedicated hosting service for hosting multiplayer game instances or facilitate the creation of game instances hosted by user computing devices. In some embodiments, the host application system 132 can provide a lobby or other virtual environment for users to virtually interact with one another. Such environments may include environments for conducting transactions between players, such as an auction house or type of environment for facilitating transactions.

Data Store

The interactive computing system 130 can include one or more data stores 134 that are configured to store user account information associated with game applications hosted by the interactive computing system 130 and/or the application host systems 132.

Reward Distribution System

The interactive computing system 130 can include a reward distribution system configured to implement a reward distribution system associated with a game application hosted by the interactive computing system 130 and/or the application host systems 132.

The reward distribution system 134 can be configured to provide virtual rewards for a user to unlock during one or more defined time periods. The system can track the user's progression and provide virtual rewards associated with defined completion thresholds. The completion thresholds may define a number of nodes accessed or an amount of advancement currency or number of advancement tokens spent during the season. The thresholds can define and identify virtual rewards that a user receives as soon as the threshold is exceeded. For example, a progression structure may include 100 nodes or require 100 advancement tokens to progress access all of the rewards within the progression structure. The map may include a plurality of thresholds that are based on the completion percentage of the nodes or advancement tokens used, such as 50%, 75%, and 100%. As the user satisfies the thresholds, the user can unlock the virtual rewards associated with each threshold. The virtual rewards may be distributed to the user as soon as the threshold has been satisfied or at the end of a defined period of time, such as the end of a reward season, based on the highest threshold achieved. The virtual rewards associated with the completion thresholds may also be associated with one or more progression tracks and the user receives virtual rewards associated with the one or more progression tracks of the user account.

The virtual rewards for a season can be available for a user during a defined time period, also referred to as a season. During a season, a user can progress through a reward map 200 by unlocking reward nodes 202. The reward map 200 and virtual rewards associated with the reward map 200 can only be accessed during the defined time period. The time period may be for any defined length of time, such as 1 day, 1 week, 1 months, 6 months, 1 year or any other defined time period. The user can unlock reward nodes 202 within the video game. The reward nodes may be unlocked using a virtual currency that is used specifically for unlocking reward nodes 202, also referred to as advancement currency. In some embodiments, the advancement currency may be a progression based reward, such as experience points, earned for completing actions within the game application.

The reward distribution system 134 can be configured to provide access to the user computing systems within the game application. The reward distribution system may be configured to communicate with the reward module 122 through the game application. The reward distribution system 136 may be incorporated within the application host system 132 hosting the game application. The reward distribution system can control access to the rewards and distribute the rewards in accordance with inputs received from a user. The reward distribution system can be configured to provide a user interface for display within the game application for selection of rewards by the user, such as the reward map 200. In some embodiments, the reward distribution system can dynamically update the rewards that are available to users during a season. For example, the rewards that are available during a season may be rolled out over the course of the season rather than all at once.

Virtual Environment

As used herein, a virtual environment may comprise a simulated environment (e.g., a virtual space) instanced on a user computing system 102. The virtual environment may be instanced on a server (e.g., an application host system 132 of the interactive computing system 130) that is accessible by a client (e.g., user computing system 102) located remotely from the server, to format a view of the virtual environment for display to a user of the client. The simulated environment may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

The game instance of the game application 110 may comprise a simulated virtual environment, for example, a virtual environment that is accessible by users via user computing systems 102 that present the views of the virtual environment to a user. The virtual environment may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). In some embodiments, the instance executed by the computer components may use synchronous, asynchronous, and/or semi-synchronous architectures.

It should be understood the above description of the manner in which state of the virtual environment associated with the video game is not intended to be limiting. The game application may be configured to express the virtual environment in a more limited, or richer, manner. For example, views determined for the video game representing the game state of the instance of the video game may be selected from a limited set of graphics depicting an occurrence in a given place within the video game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the video game are contemplated.

The game application 110 generates game state data 116 that may be used locally within the game application and may be transmitted to the interactive computing system 130 over network 108. The execution of the instance of the game application 110 may include determining a game state associated with the game application. The game state information may facilitate presentation of views of the video game to the users on the user computing systems 102. The game state information may include information defining the virtual environment in which the video game is played.

The execution of the game instance may enable interaction by the users with the game application and/or other users through the interactive computing system 130. The game application may be configured to perform operations in the game instance in response to commands received over network 108 from user computing systems 102. In some embodiments, users may interact with elements in the video game and/or with each other through the video game.

Users may participate in the video game through client game applications implemented on user computing systems 102 associated with the users. Within the game instance of the video game executed by the game engine, the users may participate by controlling one or more of an element in the virtual environment associated with the video game. The user-controlled elements may include avatars, user characters, virtual environment units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual environment. The user characters may include heroes, knights, commanders, leaders, generals and/or any other virtual environment entities that may possess strength, skills, abilities, magic powers, knowledge, and/or any other individualized attributes. The virtual environment units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the video game.

The user controlled element(s) may move through and interact with the virtual environment (e.g., user-virtual environment units in the virtual environment, non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, and/or other communications. Communications may be received and entered by the users via their respective user computing systems 102. Communications may be routed to and from the appropriate users through server(s) (e.g., through application host system 132).

Execution and/or performance of the user action by game engine 112 may produce changes to the game state, which may reflect progresses and/or results of the user actions. In some examples, state changes caused by the execution of the user actions may be recorded in the application data store 106 and/or data store 134 to facilitate persistency throughout the instance of the video game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual environment. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual environment locations controlled by or associated with the users; craft or transport virtual items; interact with, compete against or along with non-player entities and/or virtual environment elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual environment. In some examples, the given user may input commands to compete against elements in an environment within the virtual environment—e.g., Player vs. Environment (PvE) activities. In some examples, the given user may input commands to compete against each other within the virtual environment—e.g., Player vs. Player (PvP) activities.

The instance of the game application 110 may comprise virtual entities automatically controlled in the instance of the game application. Such virtual entities may or may not be associated with any user. As such, the automatically controlled virtual entities may be generated and/or developed by artificial intelligence configured with the game application and/or servers (e.g., application host system(s)) by a provider, administrator, moderator, and/or any other entities related to the game application. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (e.g., application host system 132). As used herein, such automatically controlled virtual environment entities in the instance of the video game are referred to as "non-player entities."

In an online game, the instance of the video game may be persistent. That is, the video game may continue on whether or not individual users are currently logged in and/or participating in the video game. A user that logs out of the video game and then logs back in some time later may find the virtual environment and/or the video game has been changed through the interactions of other users with the video game during the time the user was logged out. These changes may include changes to the simulated physical space, changes in the user's inventory, changes in other users' inventories, changes experienced by non-user characters, and/or other changes.

Embodiments of Reward Distribution System

Figure 2B:
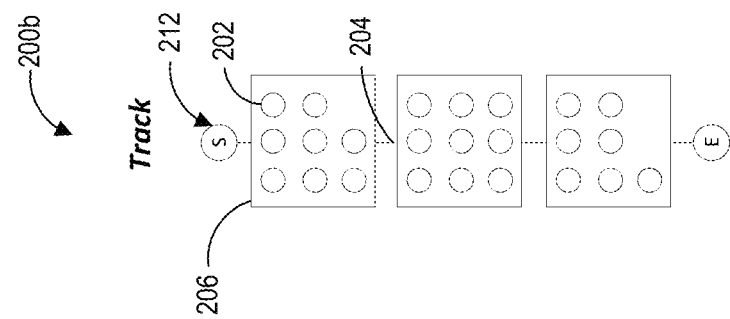
FIG. 2B shows another embodiment of a reward map.
Figure 2A:
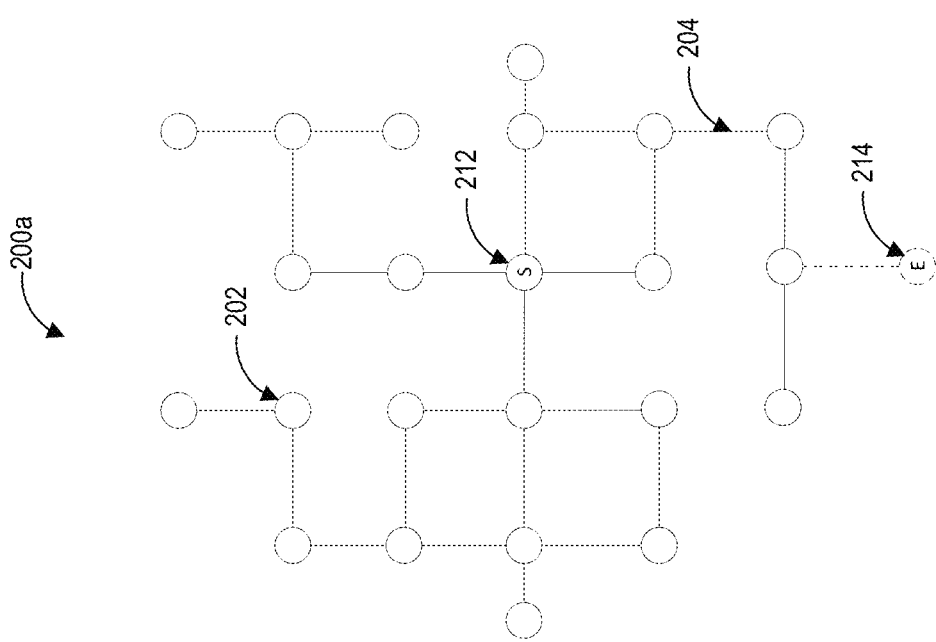
FIG. 2A illustrates an example embodiment of a reward map.
Figure 2D:
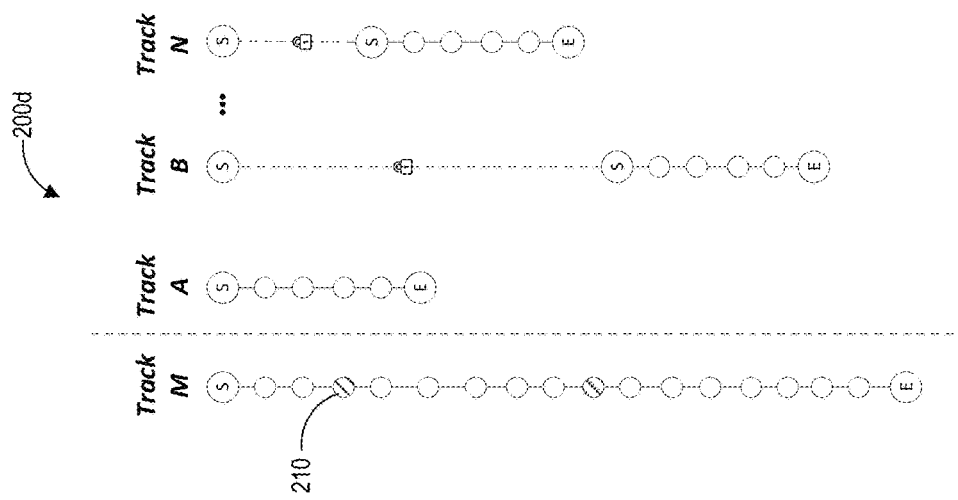
FIG. 2D shows another embodiment of a reward map.
Figure 2C:
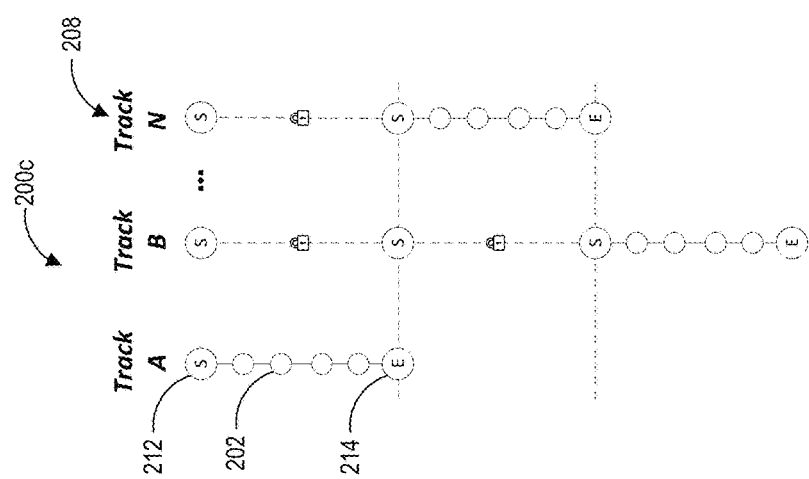
FIG. 2C shows another embodiment of a reward map.

FIGS. 2A-2C illustrate example embodiments of a progression structure for a reward distribution system. FIG. 2A illustrates an embodiment of a reward progression map 200.

The RPM 200 provides a visual representation of reward nodes, generally referred to with the callout 202, connected by a series of links 204. Each node includes one or more links 204 to other reward nodes 202. The RPM 200 includes a series of non-linear branching tracks formed by the reward nodes 202 and links 204. Examples of various embodiments of RPMs are illustrated in FIGS. 2B, 2C, 3A, 3B, 4A, and 4B. A reward map 200 may include any number of reward nodes. For example, a reward map 200 may include 10, 15, 30, 50, 100, or any number of reward nodes. In some embodiments, the number of reward nodes may dynamically change during a season to increase the number of reward nodes that a player can unlock.

The reward map 200 can be available for a user to interact within the game application during a defined time period, also referred to as a season. After the defined time period, the reward map 200 and virtual rewards associated with the reward map 200 are inaccessible. The time period may be for any defined length of time, such as 1 day, 1 week, 1 months, 6 months, 1 year or any other defined time period.

During this time period, a user can progress through the reward map 200 by unlocking reward nodes 202. The user can unlock reward nodes 202 within the video game using a virtual currency used specifically for unlocking reward nodes 202, also referred to as advancement currency. The reward nodes 202 can provide one or more virtual rewards. In some embodiments, the rewards may be segmented into tiers, such as a first tier reward and a second tier reward. When unlocking a reward node 202 the user can receive the reward(s) from the reward node 202 associated with the tier of the user account. A user may start at tier one and advance to an upper tier by purchasing a tier advancement pass, which advances the tier of the user account to the tier associated with the purchased tier advancement pass. The virtual currency used to purchase the tier advancement pass can be a different type of virtual currency than the advancement currency.

The advancement currency can be earned by engaging in activities within the video game (such as, for example, completing quests, gaining achievements, performing specific actions within an instance of a game, and/or other actions defined by the video game). For example, the advancement currency may be experience points (XP) that the user gains by performing these types of activities. As the user gains XP, the user account may advance through a series of discrete levels having defined XP requirements. In some embodiments, the advancement currency may be different than XP earned by the user. For example, the user can gain a defined amount of advancement currency at each level, such as one advancement token per experience level. The advancement currency may be gained through defined types of activities or game modes within the game.

The advancement currency can be a different type of currency from other currency used within the video game. In some embodiments, the advancement currency may be purchased using virtual currency or real currency. Additionally, there may be different categories of advancement currency. For example, there may be advancement currency that is earned by performing specific actions, fulfilling quests, or acquiring achievements within the game that allow the user to access specific regions within the game. For example, the user may be provided with a specific type of advancement currency for winning a match. The match winning advancement currency may be used to unlock specific nodes within the map. For example, some nodes on the map may only be unlocked if they user receives a type of advancement currency gained from winning a match.

Each node within a reward map 200 may have the same requirements to unlock the node 202, such as one advancement token, or nodes 202 can have different unlock requirements, for example, individual nodes can require one, two, or three tokens. The reward map 202 may include different types of nodes 202, which may require different types of advancement currency to unlock. For example, certain nodes may require that a user earn a specific type of advancement currency to unlock the node. Advancement currency may be stored in a user inventory and the user can spend the advancement currency at any time during the season. If the advancement currency is not used within the defined time frame of the current season the advancement currency may be lost, or otherwise removed from the user's account.

Figures 3A, 3B, 4A, 4B:
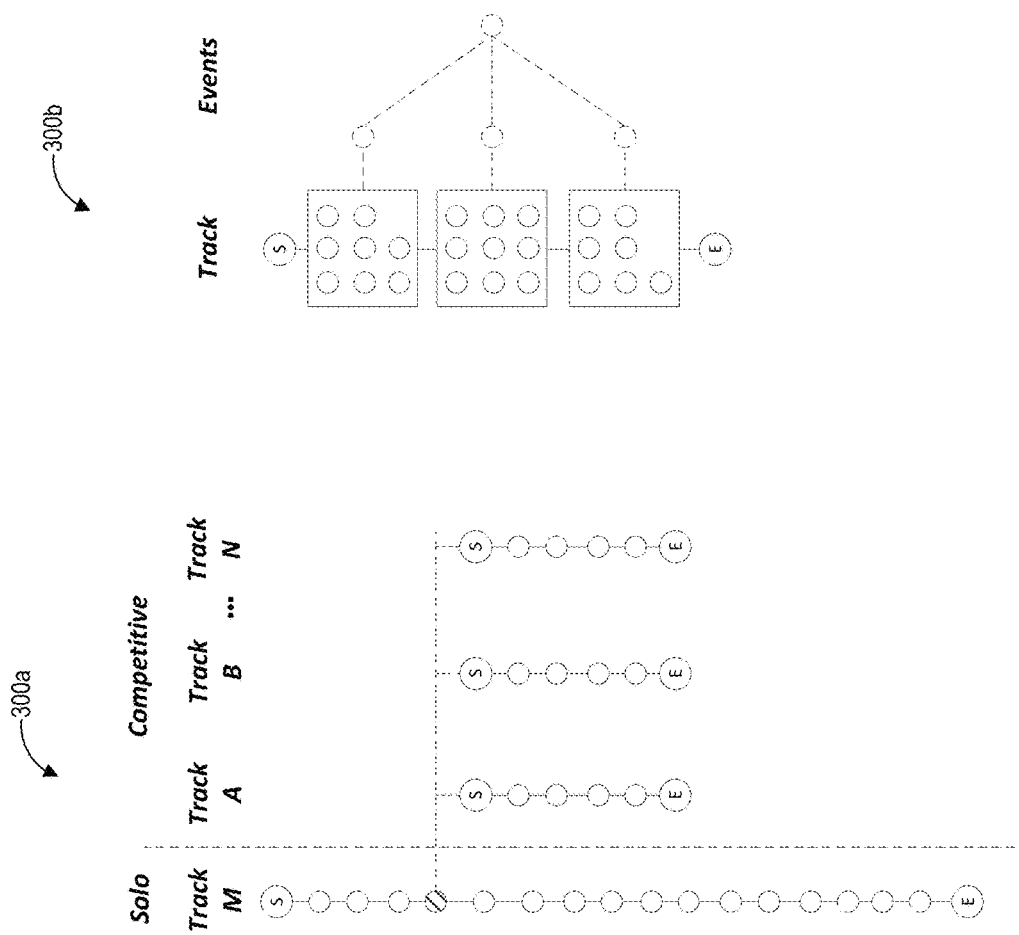
FIG. 3A shows another embodiment of a reward map.
FIG. 3B shows another embodiment of a reward map.
FIGS. 4A and 4B show embodiments of leaderboards in competitive events.

The reward map 200a illustrates an embodiment with a defined start node 212. The user can start at the start node 202 and choose which nodes to unlock on the user's reward track. The user can move to unlock any node 202 that is considered adjacent to an unlocked node by a linking path 204. At a given node 202, the user may have multiple options for progressing to the next adjacent node. The user may move to any node on the map that has already been unlocked. The map defines relationships between nodes 202 and identifies nodes 202 that are adjacent or accessible by another node 202 (e.g., a node may be a portal to another map). The map 200 can be configured to display each node in a manner that provides visualization for the user of each node, adjacencies between nodes, and the number of nodes between nodes on the path. For example, in FIG. 2 each node is identified by circle on a defined pathway. As illustrated in FIG. 3A, the nodes 202 on reward map 300a do not lead directly to the end node 214, and the number of nodes between the start node 212 and the end node 214 can be different based on the nodes 202 that are unlocked by the user. The reward map may optionally include an end node 214. Though in some embodiments, the map may not include an end node. Rather, a user can progress to any node that interests the user during the season.

With additional reference to FIG. 2B, the reward map 200b illustrates an embodiment that includes multiple node groups 206. Each node group provides the user with a plurality of nodes 202. Once the user completes a threshold number of nodes 202 in the node group 206, the user can progress to the next node group. In some instances, the threshold may be all of the nodes within the node group 206, or may be a number of nodes less than the total number of nodes within the node group. In some instances, the nodes within a node group may have different advancement currency requirements for unlocking nodes within a node group. For example, one type of node associated with a reward for unlocking an emote for a character may require less than a node associated with a reward for unlocking a new character skin. In some instances, the reward nodes may be nested, such that a reward for a specific reward is dependent upon a previous reward and requires one or more previous rewards to be unlocked before it can be unlocked. For example, a first reward may be a new character skin and a second and subsequent nested rewards can be variations of the new character skin. In some embodiments, the progression threshold for each node group can be independent of the progression of other node groups. For example, if the progression threshold for each node group is 60%, completing additional nodes within a first node group does not reduce the threshold for the second node. Whereas, in other embodiments, each node group may be unlocked based on the total number of nodes unlocked and/or advancement currency earned.

FIG. 2C illustrates an embodiment of a reward map 200c that includes a plurality of advancement tracks A through N 208. The advancement tracks can have no overlap between nodes of different tracks. The user can select a track and progress through the defined track from the start point to the end point. In some instances, the track may include mutually exclusive choices where the user can only pick one of two or more available nodes. In some embodiments, after the user completes a track, such as Track A, the user may then select a second track to complete, either track B or N. In some embodiments, the user may only pick a subset of the available tracks based on various characteristics associated with the user account and/or based on the video game. For example, in a game with different factions (e.g., robots v. ninjas), each faction may be associated with a different subset of available tracks for selection by the user. In some embodiments, the user may have to use different reward maps with different non-linear advancement tracks. The video game may have any number of tracks.

Each track 208 can include a start node 212, a plurality of nodes 202, and an end node 214. The different types of nodes may require separate types of advancement currency in order to unlock the node. For example, the user account may receive a first type of advancement currency at the beginning of the season in order to unlock one of a plurality of tracks. The intervening nodes can accept a second type of advancement currency to unlock. Upon completion of the end node 214, the user account may receive the first type of advancement currency, which can be used to unlock another one of the advancement tracks 208. By providing the user with different tracks, the user can have different options for unlocking nodes and accessing different virtual rewards. For example, a user may want to acquire a specific virtual item that is associated with one of the tracks. The various tracks may be associated with specific categories (for example, a specific virtual character class within the video game). By having multiple tracks, the user can determine which rewards are most important and/or valuable to the player.

FIG. 2D illustrates an embodiment of a reward map 200d that includes a plurality two different types of advancement tracks, track M, and tracks A through N. Track M can refer a master track, or a primary advancement track, that the user progresses along within the video game. In parallel, the user can also progress down one or more secondary advancement tracks. The secondary advancement track may be unlocked using a first type of currency as explained above with reference to FIG. 2C. The master track may have one or more nodes 210 that provide the user with the first type of advancement currency when unlocked. The user may spend the first type of advancement currency to unlock an advancement track, independent of progress on other secondary tracks, such that the user may be progressing along multiple secondary tracks in parallel. In some instances, the first type of advancement currency may be rewarded after completion of the secondary track, such as described with respect to FIG. 2C, such that the user is progressing along the master track and one of the secondary tracks in parallel. The identification of tracks as primary or secondary does not necessarily indicate an order, level of priority, or ranking of the tracks. As used herein, the use of primary and secondary can refer to a random and/or unique track identifier.

FIGS. 3A and 3B illustrate embodiments of the reward distribution system where the reward distribution system includes one or more competitive tracks or events associated with a reward track. In FIG. 3A, the embodiment provides an example of a battle pass where the user progresses along the primary track for a determined number of nodes and then unlocks access to one or more competitive tracks. The competitive tracks can be similar to the advancement tracks describes in association with previous figures. In some embodiments, the competitive tracks are mutually exclusive. The competitive tracks may be unlocked by using an advancement currency that is awarded based on progress along the primary track. The user can then use the awarded currency to select a competitive track for progression. The competitive track can allow the user to engage in competitions that are distinct from an actual competition that is being played during individual game sessions. For example, during an individual game session, a user may be competing as an individual or a team to win the game session, such as, a battle royale match, capture the flag, death match, or other type of game mode, that has a defined victory criteria within a game session. The goal of the competitive track can be defined using criteria that is not achieved within a single game session. For instance, a user can accumulate points associated with the competitive event during a plurality of game sessions. In some embodiments, the user can accumulate points for the competitive event by performing activities outside of a game session, and/or outside of the video game. For example, the player may be awarded points for engaging in social media related activities that are associated with the video game, or activities within a companion application associated with the game.

FIGS. 4A and 4B illustrate example leaderboards for competitive events. The competitive events can be limited to a subset of players that satisfy event access criteria, which may be selection of a specific competitive track, an amount of virtual currency, progression along a specific track, and/or other event access criteria. The users may receive virtual rewards based on a ranking within the competitive event. In some embodiments, the user may be required to choose between mutually exclusive prizes at the end of the event. In some embodiments, the winner or a subset of the ranked users may select one or more virtual rewards that are to be distributed to users competing within the event and/or users playing the game. In such an instance, users or groups of users (such as all users within a specific track) may be competing to select a virtual reward that is preferable to users of that group as compared to other rewards. For example, a reward may be a unique skin for a specific type of weapon that is used primarily by players within a specific track. The competitive events may be cross faction competitions that allow players of different factions to compete together within the same track (e.g., all snipers or close combat archetypes) in order to win a specific reward.

The competitive track may award currency associated with the competitive track that is different from currency that is awarded and used to unlock nodes within the primary track. The competitive currency can allow the user to progress along the competitive track as well and unlock rewards on the competitive track.

FIG. 3B illustrates an embodiment of track 200B from FIG. 2B, where the user unlocks certain events by satisfying an event unlock threshold, which can be different from the progression threshold to move to the next node group. The event unlock threshold can provide the user with access to particular events within the game that are only unlocked for a subset of players that have access to the event. These events can be competitive events, such as described with respect to FIG. 3A, additionally, these can be gameplay events within the game that are unlocked based on the competitive progression. For example, the player may be required to progress along different node groups in order to unlock competitive events, which, if completed, unlock a final competitive event. This setup may have any number of layers. The video game can have the users unlock multilayered competitive events. These events may include different game modes that allow the players to be involved in alternative game modes that are open only to a subset of players within the video game. In some embodiments, the events result in competitive events that affect not only the subset of players competing in the competitive events, but also events that happen within the video game. For example, the completion of an event may result in the selection of one or more virtual rewards that are distributed to users playing the video game. In some embodiments, the users competing in the events may determine the results of an ongoing campaign or story within the video game. For example, the winning player or group of may make a decision that determines the next plot point in the campaign.

FIGS. 4A and 4B illustrate example embodiments of leaderboards for competitive events. The competitive events may be based on actions performed by a track (such as in FIG. 4A) or individual players (such as in FIG. 4B). The competitive events can be based on actions that are different from the victory conditions for an individual scenario, such as, damage dealt, distance traveled, games played, time played, items used, players saved, and/or any other defined criteria. The criteria may not be limited to a single type of action (such as illustrated in FIGS. 4A and 4B) but may be a combination of multiple different actions or activities. The events may have a limited amount of time in which to compete the competition, which is less than the length of time for a particular season. After the completion of a specific competitive event, another competitive event may replace it, such that multiple competitive events can take place within a single season. In some embodiments, the user may be limited to competing in competitive events a defined number of times per day.

Additionally, in instances where a player is associated within different tracks, the player may be required to choose a single track for the competition. The player may unlock slots for competitive events based on progression on the competitive tracks. For example, based on advancement along the competitive track, a user may unlock a plurality of competition slots and the user can select the competitive events that the user will be participating in at any given time, such that the user is competing in multiple competitive events in parallel.

The various embodiments and features described in FIGS. 2A-2D and 3A-3B with reference to the reward maps have been set forth and described with respect to different figures. However, the features can be combined in an any combination when generating a reward map for a video game. For example, any reward map can include different types of nodes, any variation of a reward map can replace any of the tracks illustrated in FIGS. 2C, 2D, and 3A, or any other variation of the reward maps described herein.

The user can select nodes within the map to generate a node advancement interface (e.g., a pop-up window). The node advancement interface can provide the user with information about a reward node 202 including all the rewards that are available at the node and the tiers associated with each virtual reward. The virtual rewards may be previewed by the user. The system may be configured to display a cost to the user to unlock the selected node and one or more paths a user can follow to unlock the node. For example, a node that is positioned three nodes from the user can provide the cost of advancement currency the user would need to spend in order to unlock the selected node. Additionally, the interface may identify virtual rewards unlocked at other nodes prior to advancing along the identified path to the selected node.

Virtual rewards can be associated can be associated with at least one track. The track structure may include any number of defined tracks. A user can purchase access to additional tracks using virtual currency and/or real currency. The user may have various options to acquire access to different tracks. In some embodiments, the user may be able to gain access to a different track by playing the game. In some embodiments, the access to higher tier tracks may only be obtained by purchasing access to the track.

In some instances, a reward node may force the user to select between mutually exclusive options. For example, when a user unlocks a node, the user may be forced to select between two or more virtual items that are mutually exclusive.

The system can be configured so that a user can unlock all the levels and/or tracks within a given reward map during a season. The system can track the user's progression and receive virtual rewards associated with defined completion thresholds. The completion thresholds may define a number of nodes accessed or an amount of advancement currency or number of advancement tokens spent during the season. The thresholds can define and identify virtual rewards that a user receives as soon as the threshold is exceeded. For example, a map may include 100 nodes or require 100 advancement tokens to complete the entire reward map. The map may include three thresholds that are based on the completion percentage of the nodes or advancement tokens used, such as 50%, 75%, and 100%. As the user satisfies the thresholds, the user can unlock the virtual rewards associated with each threshold. The virtual rewards may be distributed to the user as soon as the threshold has been satisfied or at the end of a season based on the highest threshold achieved during the season. The virtual rewards associated with the completion thresholds may also be associated with individual tracks such that the user receives virtual awards associated with progression along each track associated with the user account.

It should be emphasized that many variations and modifications may be made to the above-described embodiments, the elements of which are to be understood as being among other acceptable examples. All such modifications and variations are intended to be included herein within the scope of this disclosure.

Example Process of Implementing a Reward Distribution System

Figure 5:
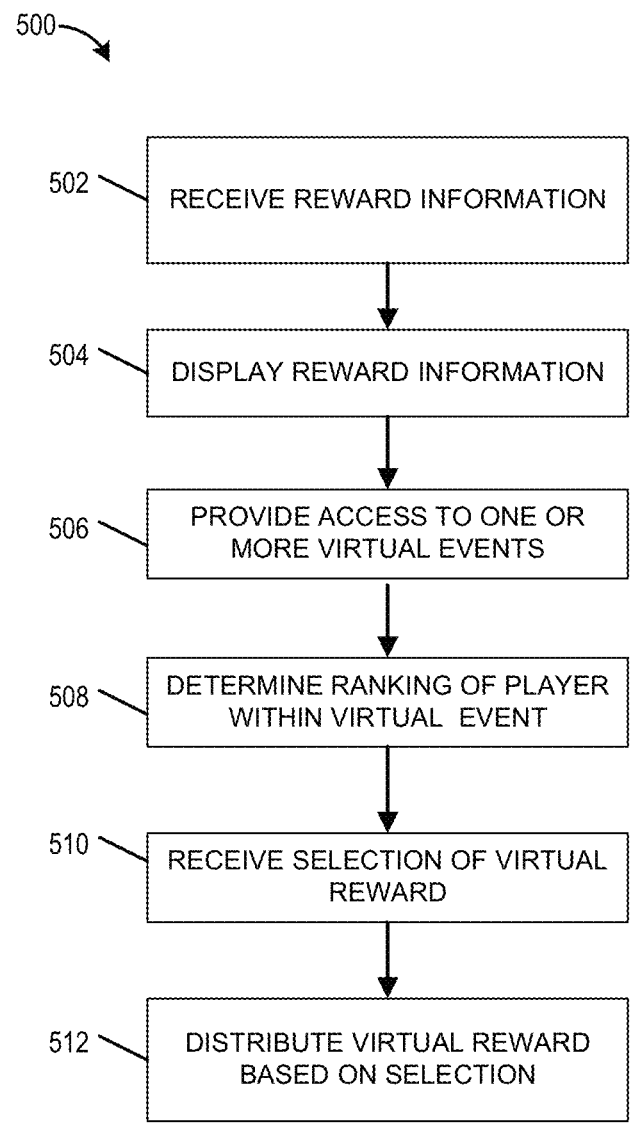
FIG. 5 shows an embodiment of a process for implementing a reward system.

FIG. 5 illustrates an embodiment of a flowchart 500 for executing processes of a reward distribution system. The processes, in whole or in part, can be implemented by CPUs and/or GPUs configured with computer readable instructions to execute a game application. For example, the process, in whole or in part, can be implemented by the game application 110, game engine 120, reward module 122, interactive computing system 130, reward distribution system 136, and/or application host system 132. Although any number of systems, in whole or in part, can implement the processes, to simplify discussion, the processes will be described with respect to the specific components.

At block 502, the game application receives reward information from the interactive computing system. The reward information can include information associated with all aspects of reward system that are configured to be displayed on the user computing device. For example, the reward information can include graphical assets for virtual items, one or more virtual reward maps, functional gameplay assets associated with rewards, and other information used by the game application to integrate the reward information into the game application for access and usability by the user. The reward information may be provided during a patch of the game, which may be received during runtime of the game or when the game is not actively executing. The reward information provided by the interactive computing system can be based on the time at which the request is received.

At block 504, the reward information is output for display on the user computing system. The reward information can include information only for events that are active when the request is made. Previous reward information may be removed based on when the user accesses the game. Only seasonal information associated with a current season may be provided to the system for display to the user. If the time window associated with a season have passed, then the information will no longer be displayed. For example, if a user logged into a game during a previous season, and then waits to login to the game after the season has expired, the previous seasonal event information is no longer displayed and only the seasonal reward information associated with the current season is displayed. In some embodiments, the reward information may be located in a specific interface within the game application, such that the user can view the reward information, independent of other events occurring within the game application. The reward information can include the identification of virtual events associated with the video game.

At block 506, the user can be provided with access to one or more virtual events. The virtual events can include one or more virtual events unlocked by the user during the game. The virtual events may be unlocked using virtual currency or real currency within the game application. The virtual events may be accessible to a subset of the players that are playing the game. For example, the events may be restricted to user accounts that have unlocked access to a specific track or progressed to a threshold level within a specific track. The user account may be able to access a plurality of virtual events based on unlocks and progression within the account. Each virtual event may be limited to a subset of user accounts that satisfy the virtual event access criteria. The virtual events can be competitive virtual events, in which the players compete to determine a ranking relative to each other. The ranking may be an individual ranking or a ranking associated with a group of players, that may be a subset of the total players. The various groups of players may be associated with a specific track, such as a faction track (e.g., axis and allies), a class track (e.g., warrior, thief track, assault track, sniper track, etc.), a progression level, and/or another group of players within the game application. The virtual event can have a defined time limit for which the players are competing. For example, the virtual even may have a duration of a day, a week, or any defined length of time up to the length of a season. In some instances, a user may need to choose between competing in mutually exclusive events. In some instances, a user may need to choose between mutually exclusive groups within an event. For example, if a user may need to choose between competing as a member of a warrior track or a mage track. The user account may have a plurality of virtual event slots associated with the account, and may select virtual events to compete in for each available slot. In such instances, there may be more virtual events available to the user than available slots.

At block 508, the game application can determine the ranking of the player within a virtual event. The ranking of the player in the virtual event may be updated so that the player can see their current ranking throughout the duration of the event. When an event ends, the user account can receive a notification that the event has ended and the final ranking within the event. Based on the final ranking, the user may be provided with options for selecting a virtual award associated with the event.

At block 510, the game application can receive a selection of a virtual reward associated with the virtual event. The selection of the virtual reward is received from the user of one or more virtual reward options associated with the virtual event. Depending on the type of event, the user may be making a selection that distributes the selected reward to a plurality of different users. For example, if the user wins the event, the user may be able to select an award that is distributed to all players that participated in the event. In some instances, in which multiple users are within the winning group, the user may vote on the award that is to be distributed to the group and/or other players within the game. The virtual reward receiving the highest number of votes would then be selected as the virtual reward. The selection of the virtual reward may require the expenditure of a defined amount and type of advancement currency to be paid by the user. Prior to making a final selection, a user may preview the types of awards that are available to the user. The user may then make a selection of the virtual reward(s).

At block 512, the game application can distribute the virtual reward to one or more users based on the virtual event. The virtual rewards can be distributed to a determined subset of users within in the game. The subset of users may be based on users that competed in the event, where each user that competed receives a reward for competing in the event based on the selection of other users at the end of the event. In some embodiments, the users may be required to meet the advancement requirements (e.g., tokens) in order to receive the reward. In other embodiments, the users may need to meet the requirement (e.g., provide tokens) in order to join the event and then receive the determined reward after the event concludes.

Computing System

Figure 6:
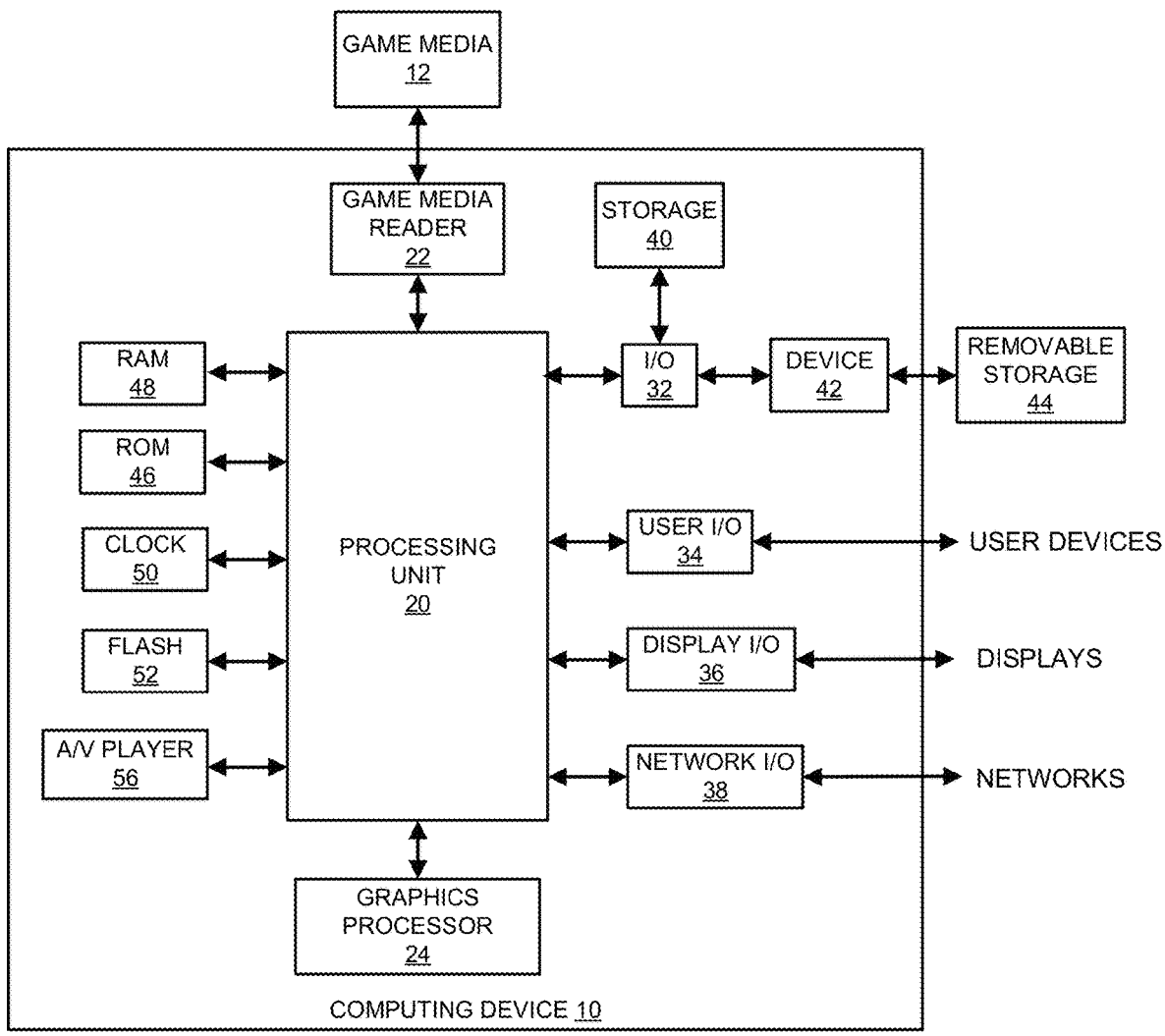
FIG. 6 shows an embodiment of a computing device.

FIG. 6 illustrates an embodiment of a hardware configuration for a computing system 10 configured for implementing a seasonal reward distribution system. Other variations of the computing system 10 may be substituted for the examples explicitly presented herein, such as removing or adding components to the computing system 10. The computing system 10 may include a computer, a server, a smart phone, a tablet, a personal computer, a desktop, a laptop, a smart television, and the like.

As shown, the computing system 10 includes a processing unit 20 that interacts with other components of the computing system 10 and also components external to the computing system 10. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing system 10 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 10 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 10 also includes various components for enabling input/output, such as an I/O 32, a user I/O 34, a display I/O 36, and a network I/O 38. As previously described, the input/output components may, in some cases, include touch-enabled devices. The I/O 32 interacts with storage element 40 and, through a device 42, removable storage media 44 in order to provide storage for the computing system 10. The storage element 40 can store a database that includes the images, gameplay logs, and/or AI models. Processing unit 20 can communicate through I/O 32 to store data, such as game state data and any shared data files. In addition to storage 40 and removable storage media 44, the computing system 10 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 10 on a display device, such as graphics, user interfaces, video, and/or other visual content. The computing system 10 may comprise one or more integrated displays configured to receive display output signals produced by the display I/O 36, which may be output for display to a user. According to some embodiments, display output signals produced by the display I/O 36 may also be output to one or more display devices external to the computing system 10.

The computing system 10 can also include other features that may be used with a game, such as a clock 50, flash memory 52, and other components. An audio/video player 56 might also be used to play a video sequence, such as a movie. It should be understood that other components may be provided in the computing system 10 and that a person skilled in the art will appreciate other variations of the computing system 10.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 10 is turned off or loses power.

As computing system 10 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for providing a virtual item distribution system to users in an online game, the method comprising:
   by one or more processors configured by machine-readable instructions,
      executing a game instance of a virtual environment in which the online game is played, and to facilitate presentation of virtual environment of the online game to a plurality of users, including a first user, within the same game instance of the virtual environment, wherein each user is associated with a user account;
      presenting a virtual reward interface within the online game, wherein the virtual reward interface provides a primary reward track comprising a first plurality of virtual reward nodes and a secondary reward track comprising a second plurality of virtual reward nodes wherein the first plurality of virtual reward nodes are associated with virtual rewards of the primary reward track and the second plurality of virtual reward nodes are associated with virtual rewards of the secondary reward track, wherein the primary reward track and the secondary reward track are accessible by the first user accounts for a defined time period, wherein a first user account has a first level of progression associated with the primary reward track and a second level of progression associated with the secondary reward track, wherein the first level of progression is independent of the second level of progression;
      providing access to a first virtual event to a first subset of user accounts based at least in part on a threshold level of progression on the secondary reward track, wherein the first virtual event is a game instance accessible to the first subset of user accounts;
      determining a ranking of the first user account based on participation within the first virtual event;
      based on a determination that the first user account satisfied a ranking threshold, receiving a selection of a first virtual reward based at least in part on the determined ranking of the first user account; and
      determining a distribution of the first virtual reward based on the determined ranking of the first user account.

2. The method of claim 1 further comprising receiving secondary advancement currency from the first user account to unlock access to the secondary reward track.

3. The method of claim 1, wherein the primary reward track and the secondary reward track require different types of virtual advancement currency to advance corresponding levels of progression.

4. The method of claim 1, wherein the primary reward track and the secondary reward track are different nonintersecting tracks.

5. The method of claim 1, wherein the first virtual event is a competitive event, and the ranking of first user is based on relative performance of the first user as compared to other users of the first subset of user accounts.

6. The method of claim 5, wherein the distribution of the first virtual reward includes distribution of the first virtual reward to each user account of the first subset of user accounts.

7. The method of claim 6, wherein the selection of the first virtual reward is one of a plurality of selections of virtual rewards by others that satisfied the ranking threshold, and the distribution of the first virtual reward is based on a determination that a majority of user accounts that satisfied the ranking threshold selected the first virtual reward.

8. The method of claim 5 further comprising determining the first user account satisfies event access criteria prior to providing access to the first virtual event.

9. The method of claim 1, wherein the primary reward track and the secondary reward track are inaccessible after the defined time period.

10. The method of claim 1 further comprising displaying a virtual reward node information interface identifying one or more virtual rewards associated with a first virtual reward node and respective rankings associated with the one or more virtual rewards.

11. The method of claim 1, further comprising determining progression of the first user account along the primary reward track and the secondary reward track based on in-game activities performed during a game session of the online game, and advancing the first level of progression and the second level of progression based on the in-game activities.

12. A computing system comprising:
   one or more hardware processors configured with computer-executable instructions that configure the computing system to:
      execute a game instance of a virtual environment in which an online game is played, and to facilitate presentation of virtual environment of the online game to a plurality of users, including a first user, within the same game instance of the virtual environment, wherein each user is associated with a user account;
      present a virtual reward interface within the online game, wherein the virtual reward interface provides a primary reward track comprising a first plurality of virtual reward nodes and a secondary reward track comprising a second plurality of virtual reward nodes wherein the first plurality of virtual reward nodes are associated with virtual rewards of the primary reward track and the second plurality of virtual reward nodes are associated with virtual rewards of the secondary reward track, wherein the primary reward track and the secondary reward track are accessible by user accounts for a defined time period, wherein a first user account has a first level of progression associated with the primary reward track and a second level of progression associated with the secondary reward track, wherein the first level of progression is independent of the second level of progression;

provide access to a first virtual event to a first subset of user accounts based at least in part on a threshold level of progression on the secondary reward track, wherein the first virtual event is a game instance accessible to the first subset of user accounts;

determine a ranking of the first user account based on participation within the first virtual event;

based on a determination that the first user account satisfied a ranking threshold, receive a selection of a first virtual reward based at least in part on the determined ranking of the first user account; and determine a distribution of the first virtual reward based on the determined ranking of the first user account.

13. The system of claim 12, wherein the computer-executable instructions further configure the computing system to receive secondary advancement currency from the first user account to unlock access to the secondary reward track.

14. The system of claim 12, wherein the primary reward track and the secondary reward track require different types of virtual advancement currency to advance corresponding levels of progression.

15. The system of claim 12, wherein the primary reward track and the secondary reward track are different nonintersecting tracks.

16. The system of claim 12, wherein the first virtual event is a competitive event, and the ranking of first user is based on relative performance of the first user as compared to other users of the first subset of user accounts.

17. The system of claim 16, wherein the distribution of the first virtual reward includes distribution of the first virtual reward to each user account of the first subset of user accounts.

18. The system of claim 17, wherein the selection of the first virtual reward is one of a plurality of selections of virtual rewards by others that satisfied the ranking threshold, and the distribution of the first virtual reward is based on a determination that a majority of user accounts that satisfied the ranking threshold selected the first virtual reward.

19. The system of claim 12, wherein the computer-executable instructions further configure the computing system to determine progression of the first user account along the primary reward track and the secondary reward track based on in-game activities performed during a game session of the online game, and advance the first level of progression and the second level of progression based on the in-game activities.

* * * * *